Dec. 27, 1949 R. A. GAY 2,492,565
COIN METER ATTACHMENT FOR TYPEWRITERS
Filed Feb. 13, 1946 4 Sheets-Sheet 1

INVENTOR
ROWE A. GAY,
BY Everett M. Curtis
ATTORNEY

Dec. 27, 1949    R. A. GAY    2,492,565
COIN METER ATTACHMENT FOR TYPEWRITERS
Filed Feb. 13, 1946    4 Sheets-Sheet 2

INVENTOR
ROWE A. GAY,
BY
ATTORNEY

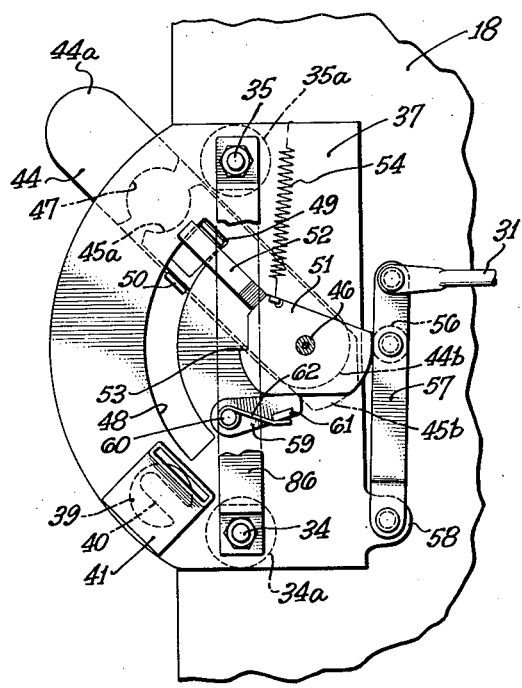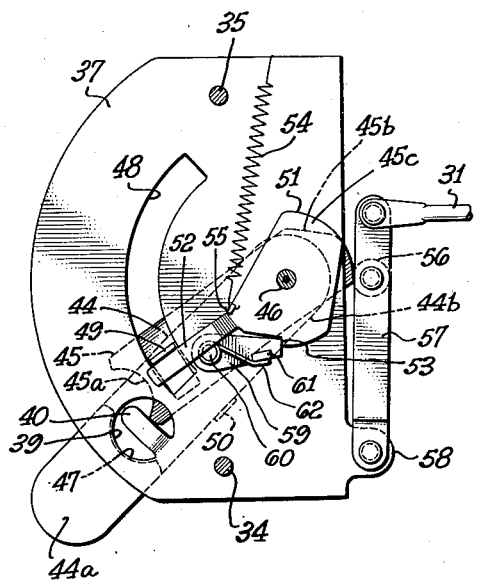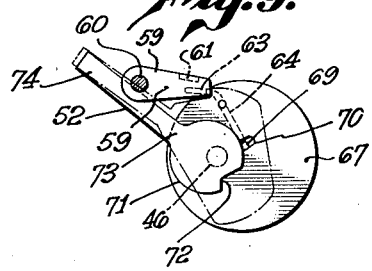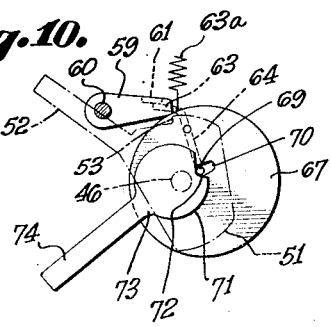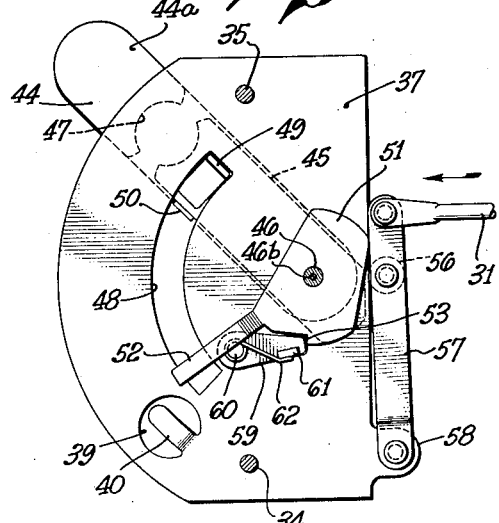

Dec. 27, 1949             R. A. GAY             2,492,565
COIN METER ATTACHMENT FOR TYPEWRITERS
Filed Feb. 13, 1946                      4 Sheets-Sheet 4
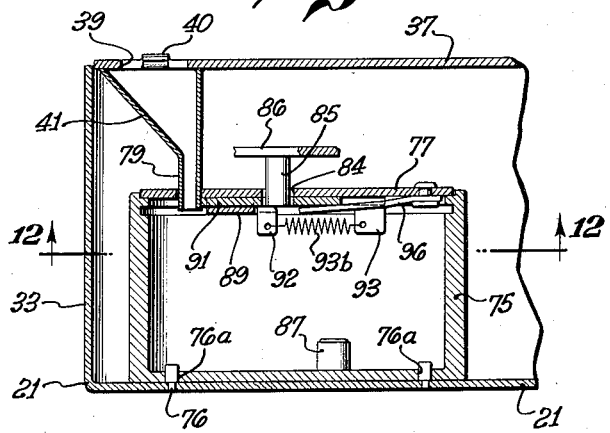
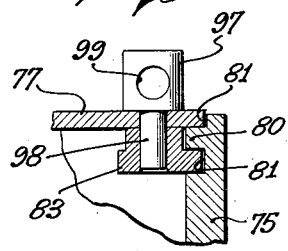
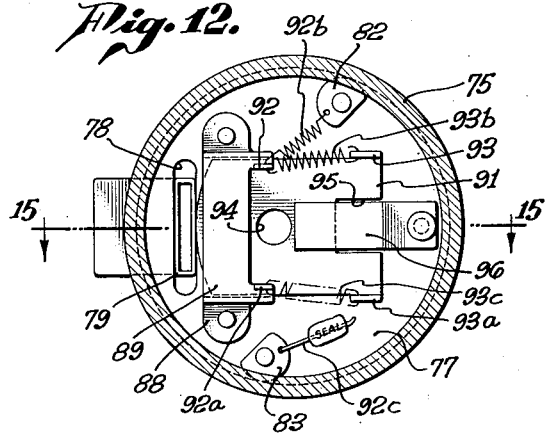
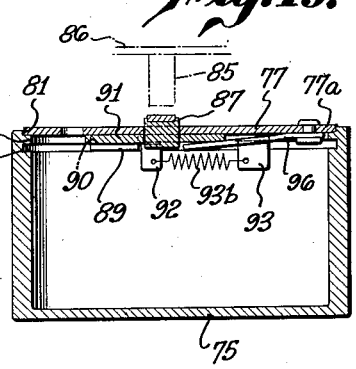
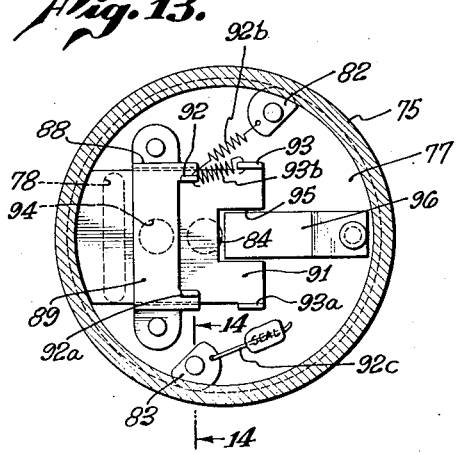
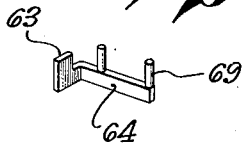
INVENTOR
ROWE A. GAY,
BY *Everett M. Curtis*
ATTORNEY Patented Dec. 27, 1949

2,492,565

UNITED STATES PATENT OFFICE 2,492,565

COIN METER ATTACHMENT FOR TYPEWRITERS

Rowe A. Gay, San Diego, Calif.

Application February 13, 1946, Serial No. 647,312

8 Claims. (Cl. 194—84)

My invention relates to coin meter attachments for typewriters, particularly auxiliary timer mechanism constructed to control the operation of typewriters offered for the use of the general public for limited periods of time and paid for by insertion of a coin in the slot; and its objects are to combine in one greatly simplified unit novel adaptations, modifications and improvements of the coin slide or lever, timer and actuating mechanism, thereby bringing about a new and better result and mode of operation than has heretofore been accomplished in the art; to furnish a new and more effective indicator for setting the unlocked periods during which the typewriter may be operated; to form the coin slot and lever into two cooperating parts, the mutual action of which is required for setting the timer; to provide a new and more simple device for making the typewriter inoperative outside of the coin controlled period, and to render the locking bar reversible in respect to operative contact with the key control rod of the typewriter so as to serve different types of conventional typewriters to which my device may be secured; to provide a coin box of novel construction to guard against tampering, and within which the coin and identification plug are securely locked; and in general to simplify and cause to be more efficient and to render more economical the construction of the several parts. These and other objects will appear from the various views of the drawing, and as hereinafter more fully described and set forth.

Attention is hereby directed to the drawing, illustrating a preferred form of my invention, in which similar numerals of designation refer to similar parts throughout the several views, and in which—

Figure 1 is a plan view, indicating the top of a conventional typewriter, and showing the table to which said typewriter is attached bin cover, upper end of locking bar, time indicator, semicircular extending ledge, coin slot, and protruding end of the two-part coin lever;

Fig. 2 is a vertical section on line 2—2 of Fig. 1, looking in the direction of the arrows and showing the table, conventional typewriter resting upon and attached thereto, bin located beneath said table and housing the actuating mechanism, operative parts and coin box and chute, the locking bar being shown pivotally mounted and extending upwardly in its well and its upper end in engagement with the key control rod of the typewriter;

Fig. 6 is a transverse section on line 6—6 of Fig. 4, looking upwardly against the top deck plate in the direction of the arrows, and showing the locking bar mechanism and auxiliary cam locked and the coin lever with its two parts in alignment and ready to receive the coin in the slot;

Fig. 7 is the same view as that of Fig. 6, but showing the coin lever after being turned ninety degrees to drop the coin into the chute leading to the coin box, the locking bar mechanism being shown locked by the coin lever cam, and the auxiliary cam being shown released;

Fig. 8 is also the same view as that of Fig. 6, but showing the coin lever locking bar mechanism and auxiliary cam in unlocked position;

Fig. 9 is a plan view of the locking dog, timer lever in wound position, auxiliary cam and release lever;

Fig. 10 is the same view as that shown in Fig. 9, but showing the release of the locking dog, and position assumed by the timer lever;

Fig. 11 is a vertical section with certain parts removed on line 11—11 of Fig. 3, looking in the direction of the arrows, and showing the coin chute, coin box, marking lug, and adjacent parts;

Fig. 12 is a lateral section on line 12—12 of Fig. 11, looking upwardly in the direction of the arrows, and showing the locking mechanism of the coin box in open position;

Fig. 13 is the same view as that of Fig. 12, except that the locking mechanism is shown in closed position;

Fig. 14 is a vertical section on line 14—14 of Fig. 13, looking in the direction of the arrows and showing detail of one of the coin box locking cams;

Figure 1:
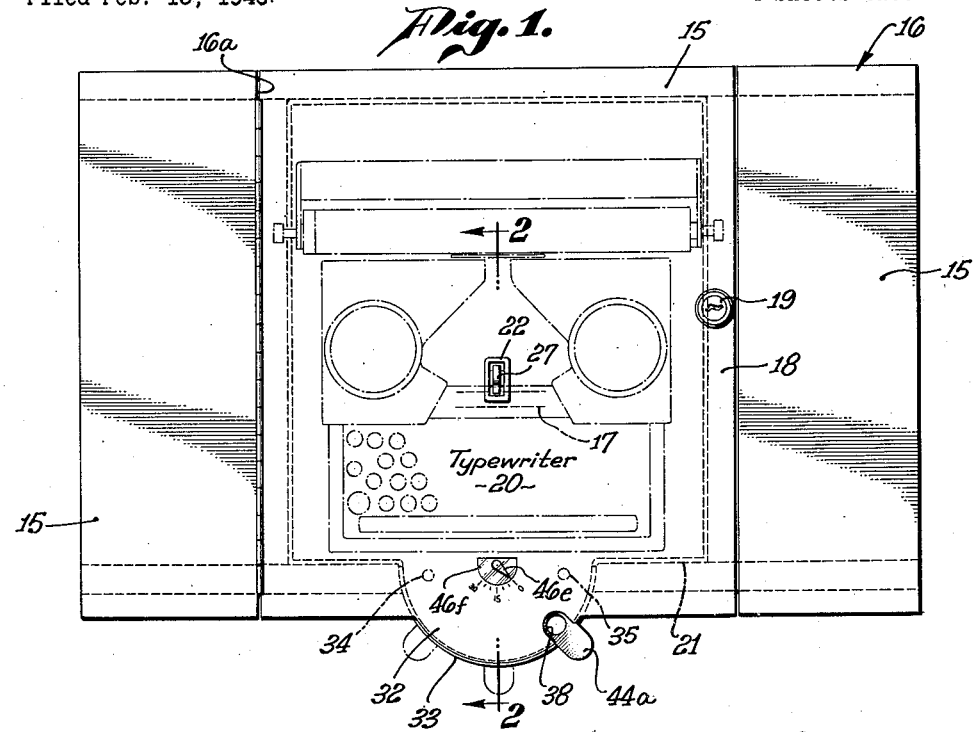

Fig. 15 is a vertical section of the coin box on line 15—15 of Fig. 12, looking in the direction of the arrows, and showing the identifying plug and marking device in cocked position, before the lid of the bin is closed down; and Fig. 16 is a perspective view of the release lever which is pivotally mounted between the top and bottom discs of the timer, and has an upwardly extending lip for making releasable contact with a downwardly depending lug upon the locking dog.

Referring to the drawing, the top 15 of the table 16 is formed with a large rectangular opening therein, to one side of which is hinged the cover or trap door 18 having on the opposite side the conventional lock 19 which serves to lock the said cover in position when closed. To the top of said cover 18 is firmly affixed the typewriter 20, preferably made inseparable therefrom. The typewriter may be any one of the conventional types or makes now upon the market, and has the usual key control rod 17 or other means, capable upon pressure from one side of rendering the keys of the typewriter inoperative. To the underside of said table 15, immediately beneath said cover, resting upon supports 15a, 15b, secured to the legs 15c of said table, and situated so as to be uncovered by the said cover upon the raising thereof, is secured the bin 21, preferably of metal and normally completely closed against access to the interior thereof, except through opening of said cover.

Below the said control rod 17, and extending upwardly through an opening in said cover 18, out of the bin 21, is the well 22, preferably of metal, and having its upper portion protruding above the upper face of said cover with its mouth adjacent to said rod 17. At the bottom of said well, two of the walls thereof are bent at right angles to form the ears 23, which being secured to the underside of said table top by screws 24, serve to seat said well firmly in position. Also one of the walls of said well is extended downwardly to form a hanger or bracket 25, having pivotally mounted thereon the locking bar 26, the upper end 27 of which bar projects out of the mouth of the well and is positioned to make engaging contact with the key control rod 17; and the lower end of which bar has the elongated slot 28 formed therein adjustably to engage with the screw-threaded end of the post 29 secured by nuts or other means to said bar. Slidably extending horizontally through the opening 30 in said post and secured therein by the threaded pin 30a, is the outer end of the pitman rod 31, the longitudinal thrust or withdrawal of which operates to lock or unlock the locking bar 26 in the manner hereinafter described.

Preferably the cover 18 is formed with the rounded ledge 32, and directly beneath said ledge and conforming to the shape thereof is alcove 33 formed by an extension of the walls and bottom of the bin 21. To the underside of said ledge and firmly fastened thereto by bolts 34 and 35 are two parallel disposed metallic plates, separated by washers 34a, 35a, and forming decks 36 and 37. Cut out of the edges of the ledge 32 and deck 36 and extending downwardly therethrough, is the coin receiving recess 38, positioned as shown (see Fig. 1) at the right thereof; and through the lower deck 37 on the left thereof is formed the coin discharging recess 39 provided with a finger 40 for intercepting the coin and for causing the same to drop into the chute or hopper 41 in the manner shortly to be described. The coin lever 42 is flattened in character and is located in the space 43 between said decks, being formed in upper and lower parts; one, the upper part 44, which has one end 44a forming a finger hold protruding outwardly from said space beyond said ledge, and the other end 44b pivotally connected to the bolt 46 extending across said space and secured to said decks; and the other, the lower part 45, which is shorter than the part 44 and has its outer end formed with the semicircular coin recess 45a and its inner end 45b pivotally connected with said bolt 46 and extending beyond the same to form the cam 45c. Extending through the part 44 of the coin lever 42 is the coin slot 47 positioned to register with the recesses 38 and 39 upon the turning of said lever; and also positioned to register with the coin recess 45a of the part 45. Also as will be observed from the drawing, the part 44 is diminished one half in thickness between said slot 47 and its inner end in order to provide registering sliding contact with the part 45, which is of said one half thickness throughout. As a consequence of such construction, when the parts 44 and 45 are aligned and when a coin of the size of the slot 47 is introduced therein, it will descend and rest upon the upper surface of the deck 37, and at the same time will make registering contact with the semicircular recess 45a, so that the two parts 44 and 45 of the lever 42 will thereby become connected, and will turn or pivot as a single unit upon the common shaft afforded by the bolt 46.

Preferably the bolt 46 is projected upwardly to form the extension 46a, and a vertical bore made therein for the reception of the rod 46b, the lower end 46c of which is bent at right angles to make engaging contact with an angle plate 46d connected with the timer winding lever 73, and on the top end of which is mounted a time indicator 46e; an opening 46f in the cover 18 being provided for the reception of said extension 46b and said indicator, and a glass window 46f being provided over said opening for observation.

Extending through the deck 37 is the arcuate slot 48, and downwardly protruding through such slot is the elongated lug 49 welded to, or forming an integral connection of, the lower lever part 45; said slot 48 and lug 49 being so positioned that upon the turning of the part 45, the said lug will slide freely in said slot, and will permit the coin lever 42 to be rotated from coin receiving position to coin discharging position and back again as shown in the drawing. (See Figs. 6, 7 and 8.) Welded to one edge of the upper part 44 of the lever 42, or integral therewith, is the short lug 50 positioned so as to make engaging contact with, but not to extend beyond, the edge of the lower part 45 of said lever and through such contact simultaneously to move both said parts contra clockwise as one toward the coin receiving recess 38; the said lug 50 being adjacent to but not extending within the slot 48.

Immediately below the lower deck 37, and pivotally mounted to turn upon the shaft bolt 46, is the cam 51, provided with the finger 52, the catch 53 and the tension spring 54, one end of which is affixed to an ear 55 on said cam and the other end of which is fastened to an edge of the said deck 37; the said cam being positioned to make engaging contact with the cam follower 56, rotatably mounted upon the rocker arm 57, which arm is pivotally connected at one end to the lobe 58 integral with the said deck and has its other end pivotally connected with the pitman rod 31; a tension spring 30b attached to pin 30 and by a link 30c to bracket 65 normally serving to turn locking bar 26 out of engagement with the key control rod 17. As will be observed in the drawing, the finger 52 is shaped and positioned always to extend across the arcuate slot 48, and to engage with and to be pushed by the lug 49 thereover, upon the clockwise movement of the lower part 45. Located to make engaging contact with the catch 53, is the dog 59 pivotally mounted upon the pin 60 secured to the underside of the lower deck 37; the said dog having integral therewith the downwardly depending lug 61 and being held in constant engagement with the adjacent edge of the cam 51 by the spring 62, coiled around the pin 60 and in contact with said lug. Positioned, through attachment to tension spring 63a secured to deck 37, to make spring actuated engaging contact with the lug 61, is the upwardly extending lip or timer throwout 63 of the release lever 64, operating as hereinafter described to lock the locking bar upon cessation of the unlocked period.

The cam 45c hereinbefore referred to cooperates with the auxiliary cam 51 to hold the parts in locked and unlocked position, one cam holding such parts locked while the other cam is in released position. This cam 45c is formed by the extension of the lower part 45 of lever 42, and cam 51 designates the entire finger piece mounted upon bolt 46 below the deck 37.

These cams operate independently as a double lock contacting cam follower 56 on rocker arm 57. For example, in Figure 6 of the drawings, cam 51 is shown operating to lock follower 56 while cam 45c is released therefrom; in Figure 7, cam 45c is shown operating to lock the follower 57 while cam 51 is in released position; and in Figure 8 both cams are shown out of contact with the follower and the typewriter unlocked.

Secured by brackets 65 to the underside of the lower deck 37 is the conventional timer 66, having the said release lever 64 pivotally mounted between the upper and lower discs 67 and 68, forming the walls thereof and being provided with the pin 69 extending upwardly therefrom through the recess 70 in the disc 67; the said pin being so disposed as to make engaging contact with the edge of the cam 71 and catch 72 therein, forming part of the winding lever 73, pivotally mounted upon the disc 67, and located immediately below the auxiliary cam 51 and turning upon approximately the same axis as that of said cam. As shown, the winding lever 73 is provided with a finger 74 similar to the finger 52 of said cam 51 and is positioned to be aligned therewith and to make contact with and to be moved by the lug 49 upon the turning of the part 45 of the coin lever 42.

In Figs. 11 to 15, I have shown my improved form of coin box 75 and adjacent parts. This box is located within the alcove 33 below the coin hopper 41, and is seated on the bottom of the bin 21 and located and kept in position by pins 76 detachably engaging with recesses in the bottom of said box. It is made of metal with preferably thick walls, and is provided with a metallic lid 77 having a slot 78 therethrough positioned to register with the mouth 79 of the hopper 41; the said mouth extending downwardly into said box so as to discharge a coin therein. Preferably, both the box 75 and the lid 77 are circular in form, the box having formed inside the top thereof the annular shoulder 80, shaped to seat the peripheral edge 77a of said lid 77; and directly beneath said shoulder is formed in the wall of said box the annular recess 81 located to engage with the locking cams 82 and 83, pivotally mounted upon opposite sides of the lid 77. Also extending through the lid 77 is the opening 84 shaped to receive and to register with the marking lug 85 carried upon bracket 86 depending from and secured to the lower deck 37; the purpose of said lug being to carry indicia upon the lower end thereof for the purpose of stamping with such indicia into the material of the plug 87 for identification. This plug 87 is inserted within the opening 84 before closing down the cover 18 carrying said deck, and which while being impressed by the stamping lug 85 upon closing said cover is pushed out of said opening and drops to the bottom of the box 75 (see Fig. 11). Normally the lug 85 thereafter remains in engaging contact with the opening 84 as shown on Fig. 12, but becomes disengaged from such opening upon unlocking the lock 19 and the raising of the cover 18. For the purpose of locking the coin box 75, I secure to the underside of the lid thereof, the strap 88 having the downwardly extending loop 89 forming the passageway 90 shaped to receive the slide 91; this strap 88 being provided with a pair of ears 92, 92a, the ear 92 being connected by the tension spring 92b to the locking cam 82, and the ear 92a being connected by a metal seal 92c to the locking cam 83; and both of said ears being also connected to another pair of ears 93 and 93a of slide 91 by tension springs 93b and 93c. As shown, the spring 92b and seal 92c serve to keep the cams constantly in releasable engagement with the annular recess 81, and the springs 93b and 93c serve to pull the slide 91 toward and further into the passageway 90, such movement of the slide being normally checked by reason of the engaging contact of the lug 85 with the opening 94 in said slide positioned to be moved to make registration therewith. In addition to the opening 94, the slide 91 is made with the square shaped recess 95 in the rear thereof, shaped to make engaging contact with one end of the flat metallic spring 96 secured to the underside of the lid 77. To provide a means of breaking the seal, I preferably construct the locking cam 83 with knob 97 mounted outside the lid 77 and connected with the pivot pin 98 of said cam; the said knob having the opening 99 therethrough within which a bar or other instrument may be inserted for turning the cam and breaking the seal.

Figure 2:
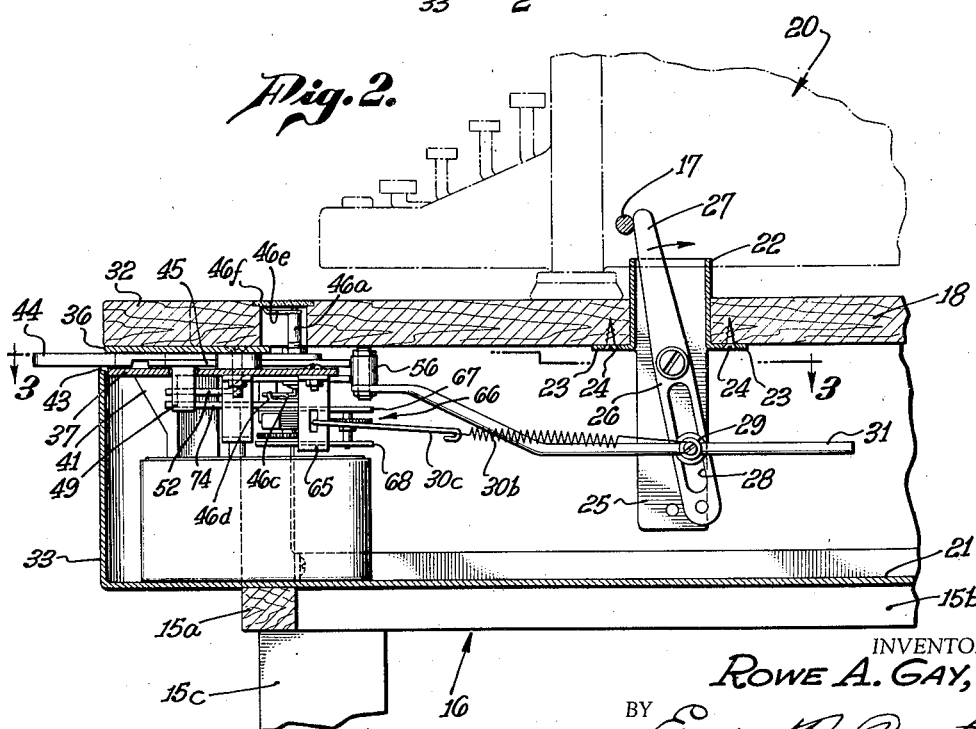
Figure 3:
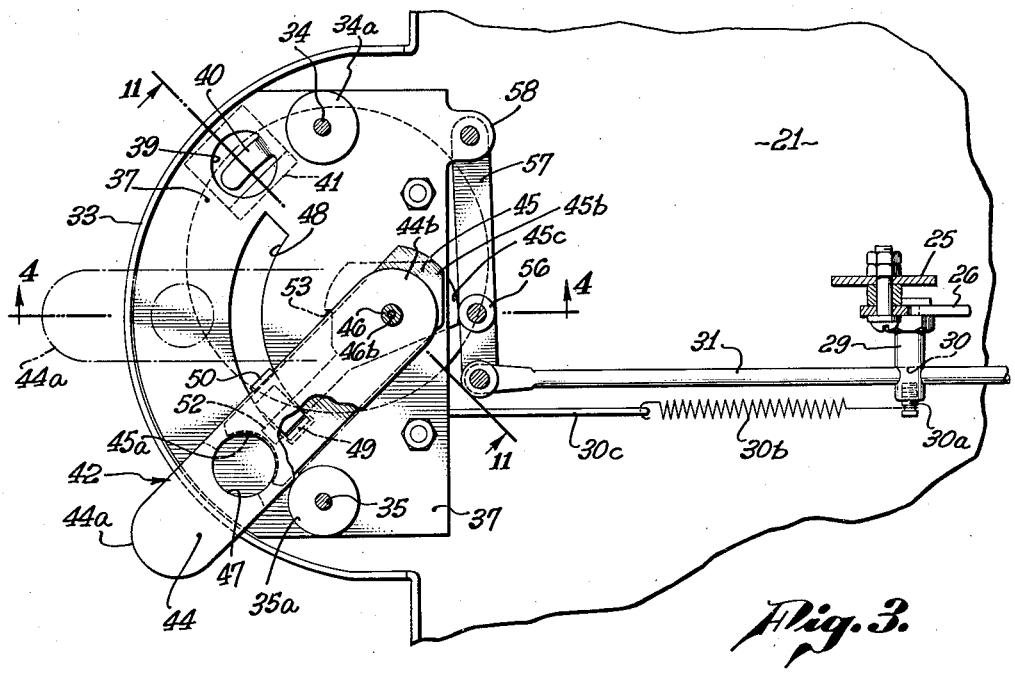
Fig. 3 is an enlarged plan view on line 3—3 of Fig. 2, looking in the direction of the arrows, and showing the lower deck plate, two part coin lever and cam, auxiliary locking cam, cam follower, rocker arm and locking bar actuating rod, and adjacent parts.
Figure 4:
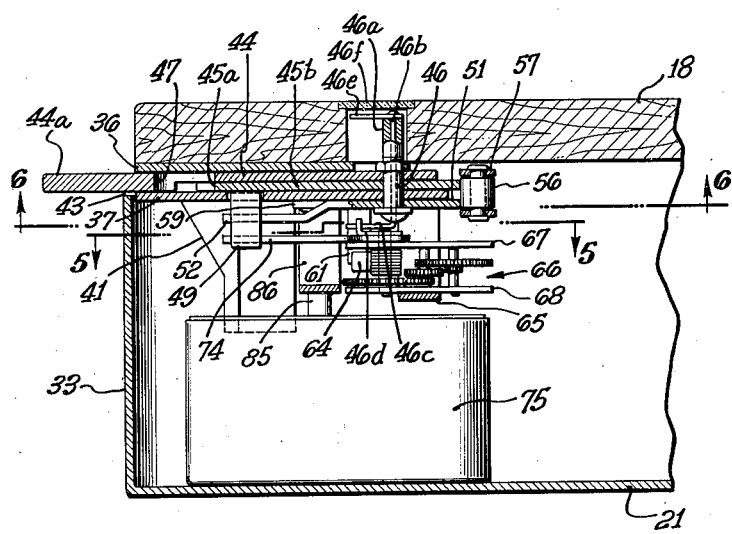
Fig. 4 is a vertical section on line 4—4 of Fig. 3, looking in the direction of the arrows, and showing the bin two part coin lever, cams, time indicator, timer, coin box and chute, and connecting parts and mechanism, the coin lever being in the position shown in dotted lines in Fig. 3, and certain parts being eliminated for better illustration.
Figure 5:
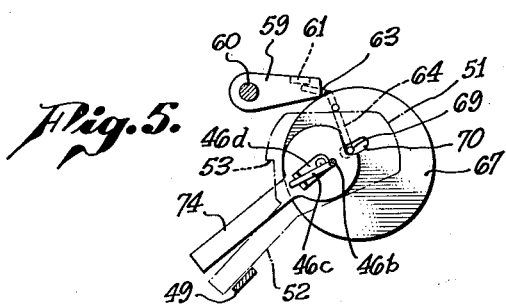
Fig. 5 is a transverse section of a detail on line 5—5 of Fig. 4, looking in the direction of the arrows, and showing the auxiliary locking cam, winding timer lever, locking dog and top of timer.

Preliminary to the normal use by a customer of my improved coin meter attachment, the typewriter 20 is firmly secured to the hinged cover 18 and made exteriorly inseparable therefrom; the upper end 27 of the locking bar 26 being brought into close engagement with the key control rod 17 of said typewriter, and the said cover being thereupon closed down and locked by the lock 19, as shown in the drawing. At the same time through the closing of said cover as above set forth, the marking lug 85 has duly marked with identifying indicia the plug 87, and has engaged the openings 84 and 94 in the box lid 77 and slide 91. Thereupon the parts being positioned and locked as shown in Figs. 1 and 2, the apparatus is set for unlocking and freeing of the typewriter for use during a limited period and for automatic relocking and resetting at the expiration thereof.

In operating my coin meter attachment when set as above described, the operator places a coin in the recess 38, so that one semi-circular edge of the coin engages with the edge of the semi-circular recess in the lower part 45 of the lever 42. Then by means of the finger hold 44a of the upper part 44 and the connection of the opposite semi-circular edge of the coin with the edge of the opening 47, a coupling is made between the upper and lower parts of the lever 42, which is turned clockwise to the limit of its swing, bringing the coin receiving recess 38 and the discharging recess 39 into registration just above the hopper 41, permitting the coin to be yieldably engaged by the finger 40 and dropped into said hopper. At the same time, as the result of such movement of lever 42, the lug 49 downwardly depending therefrom engages with the ends of finger 52 of auxiliary cam 51, and finger 74 of time winder cam 71, and carries the ends of said fingers along with said lever; having the effect of winding the timer 66, and of simultaneously disengaging the lip 63 of the release lever 64 from lug 61 of dog 59, thereby causing the dog 59 to be moved inwardly under action of spring 62 and freeing said dog to make spring engagement with the edge of auxiliary cam 51. When, however, the cam 51 is rotated by the lever 42 to its forward position shown in Figs. 7 and 8, the dog 59 will slide into engagement with the catch 53. This change of relationship of parts constitutes the action resulting from the clockwise movement of lever 42; and the first step of the operation; the second and final step being to move the lever 42 back contra clockwise to its original position.

Upon the lever 42 being subjected to such reverse movement, the short lug 50 engaging with the upper and lower parts of the said lever causes them to be returned to their position as shown in Fig. 8; the auxiliary cam 51 remaining for the time being in the position to which it was turned on the clockwise movement of said lever; in which positions both of said cams have the low sides thereof in contact with the cam follower 56; allowing the locking mechanism under tension of spring 30b to be and remain unlocked. As the escapement in the timer 66 unwinds, the winding lever 73 slowly rotates in a clockwise movement back to its original starting position during a predetermined period of time. Upon the timer reaching such position, the pin 69 of lever 64 engages with the catch 72 in the cam 71 of said lever 73, under tension of spring 62a, thereby causing the lip 63 of release lever 64 to contact the lug 61 of dog 59 and (as shown in Fig. 10) to force said dog out of engagement with the catch 53 on auxiliary cam 51; upon which disengagement as an immediate result the cam 51 under tension of spring 54 flies back to its original normal position shown in Fig. 6, bringing the dog 59 again in contact with the edge of the cam 51 and the high side of this cam in contact with cam follower 56; thereby once more locking the bar 26 against the key control rod 17 and rendering the typewriter 20 inoperative. Upon inserting another coin in the recess 38, repeating the steps hereinbefore set forth, the typewriter may be unlocked and made operative for another brief period of time.

My invention may be embodied in other specific forms without departing from the spirit or essential characteristics thereof. The present embodiment, as above set forth, is therefore to be considered in all respects as illustrative and not restrictive; the scope of my invention being indicated by the appended claims rather than by the above description, and all changes which come within the meaning and range of equivalency of the claims are therefore intended to be embraced therein.

What I claim and desire to secure by Letters Patent is:

1. In a coin controlled time meter, means actuating a locking bar and setting the meter timer means with each unlocking movement of said bar, comprising a compound coin receiving lever, said lever having overlapping upper and lower parts, said lower part being formed with a primary cam, a coin receiving opening formed from said parts, when they are in superimposed alignment, said upper part being movable independently of said lower part in one direction except when a coin is inserted in said jointly formed coin opening thereby coupling them together, a bolt member pivotally mounting said lever between a pair of spaced deck plates, said lower plate having an arcuate slot therein, an auxiliary cam member turnably mounted on said bolt member, operating means depending from said lower part projecting into said slot thereby turning said auxiliary cam, a coin discharge opening in said lower deck plate adjacent an end of said slot, said cam members when turned to their respective low points permitting movement of said locking bar into unlocking position thereby setting said timer means when the upper and lower parts of the lever are coupled together with a coin, said cam members being moved to the timer setting position of the auxiliary cam by said lever and auxiliary cam operating depending means carried by the lever, latch means connected to said timer also moved by said depending means latching said auxiliary cam independently of the primary cam in a position permitting said locking bar to be retained in unlocking engagement until said latch means is released by the meter timer means after a predetermined period, means carried by said upper part of the coin lever returning the lever to coin receiving position as a unit, comprising a lug of a length substantially equal to the thickness of the upper and lower parts of the lever maintaining said parts in superimposed alignment upon a return movement of said lever with the other of said cam members independently of the auxiliary cam member retained in a latched position by the setting of the timer, and means rotatable by the meter timer means releasing said latched cam from this position and returning the locking bar to locking position.

2. In a coin controlled time meter, actuating means controlling the movement of a locking bar and setting the meter timer with each unlocking movement of said locking bar, comprising a compound coin receiving lever, said lever having overlapping upper and lower parts, a coin receiving opening formed from said parts when they are in superimposed alignment, said upper part being movable independently of said lower part in one direction except when a coin is inserted in said coin opening to thereby couple them together, a first cam on the end of said lower part, a second cam mounted coaxially with said parts having an integral finger, a third cam mounted coaxially below said second cam having a similar integral finger, a lug depending from said lower part in engagement with said fingers of said second and third cams, a rocker arm having a cam follower engageable by said first and second cams, a pitman pivotally connected to the free end of said arm, said other end of said pitman being connected to said locking bar, whereby movement of said lever when its parts are coupled together by a suitable coin turns said second and third cams through said lug and said first cam and second cam permit the said locking bar to move to unlocking position, said second cam being turned against the action of a spring, said third cam serving to wind the timer, a catch on said third cam, a release lever having a pin thereon in engagement with said catch, a catch on said second cam, a dog engaging said second cam catch and latching said second cam in a position permitting the locking bar to remain in unlocking position, said dog being releasable from the said second cam catch after a predetermined period so that the second cam springs back to its original position, and a spring member connected to said locking bar urging said cam follower into yieldable engagement with said second cam in all positions thereof.

3. In a coin controlled time meter, said meter controlling the position of a locking bar, a coin receiving lever comprising two normally separate upper and lower parts, which overlap to form a coin receiving opening, whereby the said upper and lower parts are coupled together by a coin in said opening, a pivot member for said parts, said lower part having a cam formed on one end, a lug depending from said lower part, a second cam positioned below said first cam and pivotally mounted on said pivot member, said second cam having a finger extending into the path of said lug carried by the lower part of the lever, linkage means connecting said lock bar with said cams including a cam follower, resilient means retaining said follower in constant engagement with at least one of said cams, during the bar unlocking forward and return movement of said lever, said upper and lower parts of said lever being coupled together and moving to set the meter timer mechanism when a coin is inserted in said slot and being coupled during return movement by a lug on said upper part, a finger hold on said lever manually aiding swinging the same in a direction setting said timer mechanism, whereby said first and second cams are turned from the high points of their respective cam surfaces to their low points releasing said lock bar, timer mechanism setting means including a third cam pivotally mounted below said second cam having a finger extending into the path of said lug on the lower part of the lever, said lug setting the meter timer and latching the second cam into lock bar unlocking position independently of said first cam so that the lever returns to said starting position after the coin is dropped, an auxiliary release lever moved by said third cam, and a dog retaining said second cam latched with the low point thereof in contact with the cam follower, said dog being engageable by said release lever and disengageable from said second cam when said auxiliary lever is released by said third cam, whereby the said second cam returns to its original position.

4. In a coin controlled time meter for typewriters, means actuating a locking bar to unlocking and locking positions, including a coin receiving lever formed of upper and lower parts overlapped to form a coin receiving opening, said lever being movable from coin receiving to coin dropping position, a bolt on which said parts are pivoted, one of said parts having a first cam on one end thereof, means depending from said lower part of the lever, a second cam mounted below said first cam moved with said first cam by said depending means to unlocked position of the said bar, second means latching said second cam in said unlocking position independently of the first cam which only retains the locking bar in position until returned from coin dropping position, third means turning while setting the second cam with said lever winding the meter timer, fourth means on the opposite side of said upper part from said first means on the lower part of the lever returning said first cam to unlocking position independently of the second cam, and release means actuated by said third means releasing said second cam after a predetermined time interval permitting relocking the said lock bar.

5. In a coin controlled time meter for typewriters, means actuating a locking bar to unlocking and locking positions, including a coin receiving lever formed of upper and lower parts overlapped to form a coin receiving opening, said lever being movable from coin receiving to coin dropping position, a bolt on which said parts are pivoted, one of said parts having a first cam on one end thereof, means depending from said lower part of the lever, a second cam mounted below said first cam moved with said first cam by said depending means to unlocked position of the said bar, means latching said second cam in said bar unlocking position independently of the first cam, which movement of the coin lever with said first and second cams retains the locking bar in locking position until the coin receiving lever is returned from coin dropping position, a third cam means turned while setting the second cam in bar unlocking position simultaneously with said lever winding the meter timer, and a release means actuated by said third cam means releasing said second cam after a predetermined time interval allowing the return of said locking bar to bar locking position independently of said first cam.

6. In a coin controlled typewriter time meter, means actuating a locking bar to unlocking and locking positions, including a coin receiving lever formed of upper and lower parts, said parts jointly forming a coin slot, a member on which said parts are pivoted adjacent one end of said parts, a first cam on an end of one of said parts, means depending from a side of said lower part of said lever, a second cam pivotally mounted on said member moved with said first cam by said depending means to unlocked position of the said bar, a spring retaining said second cam in bar locking position, a finger extension carried by said second cam, said lever depending means engaging with said finger and moving said second cam against the action of said spring when said upper and lower parts are coupled together by a coin in said coin slot, said second cam cooperating with said first cam to permit said locking bar to move to unlocking position after said first cam has returned to its original position, means latching said second cam against the action of said spring in a position permitting said locking bar to remain in the unlocked position actuated by turning of said lever, means on a side of the upper part of the lever returning the upper and lower parts of the lever together with the first cam to bar unlocking position after the coin is dropped independently of said second cam's latched bar unlocking position, timer winding means actuated with the turning of said second cam to latched position, and release means actuated by said timer winding means releasing said second cam after a predetermined time permitting return of said locking bar to locking position.

7. In a coin controlled time meter, a locking bar, actuating means permitting said bar to move to and from unlocking and locking positions including a coin receiving lever formed of upper and lower parts overlapped forming a coin receiving opening, a bolt on which said parts are pivoted from a coin receiving to a coin dropping position, means depending from said lower part, a cam pivotally mounted on said bolt permitting moving of said locking bar to unlocking position when the said upper and lower parts are coupled together by a coin in said coin slot and turned on said bolt toward coin dropping position, said depending means turning said cam to bar unlocking position, means latching said cam in said bar unlocking position independently of said coin lever parts, means turned by said depending means winding the meter timer, and release means actuated by said last-named means releasing said cam after a predetermined time interval to locking position.

8. In a coin controlled time meter, a locking bar, means moving said locking bar into locking and unlocking positions comprising a compound coin receiving lever, said lever having overlapping upper and lower parts, a coin receiving opening formed from said parts, when they are in superimposed alignment, a bolt member for pivotally mounting said lever between a pair of spaced upper and lower deck plates, said upper part being movable independently of said lower part in one direction except when a coin is inserted in said jointly formed coin opening thereby coupling them together for movement to timer setting position of the meter from coin receiving to coin dropping position on said bolt member, said lower plate having an arcuate slot therein, primary and secondary cam members turnably mounted on said bolt member cooperating to momentarily hold the locking bar in locking position on movement of said lever with the coin in the time setting direction to coin dropping position, resilient means holding said locking bar in unlocking position, said primary cam member being integrally formed from the lower part of the said lever, operating means depending from said lower part projecting into said slot for operating the secondary cam member, a coin discharge opening in said lower deck plate adjacent an end of said slot, said primary and secondary cam members permitting movement of said locking bar by said resilient means from locking to unlocking position of the said bar, said secondary cam operating depending means from said lower part of the lever setting said timer means when the upper and lower parts of the lever are coupled together with a coin and moved in timer setting direction between the deck plates, said cam members being moved jointly to the timer setting position of the lever and independently to bar locking position, and latch means connected to said timer also moved by said cam operating depending means latching said secondary cam in a position permitting said locking bar to be retained in unlocking position by said resilient means until said latch means is released by the timer means after a predetermined period, said primary cam returning to bar unlocking position prior to the return of the latched secondary cam by the timer to bar locking position.

ROWE A. GAY.

REFERENCES CITED

The following references are of record in the file of this patent:

UNITED STATES PATENTS

| Number | Name | Date |
|---|---|---|
| 371,257 | Everitt | Oct. 11, 1887 |
| 1,197,757 | Mulhall | Sept. 12, 1916 |
| 2,325,244 | Graham | July 27, 1943 |